United States Patent [19]

Beavers

[11] Patent Number: 5,198,239
[45] Date of Patent: Mar. 30, 1993

[54] APPARATUS FOR CO-EXTRUDING TWO FOOD PRODUCTS

[76] Inventor: Charles T. Beavers, 621 Worthview, Fort Worth, Tex. 76114

[21] Appl. No.: 726,911

[22] Filed: Jul. 8, 1991

[51] Int. Cl.⁵ .................... B29C 47/06; B29C 47/26
[52] U.S. Cl. .................. 425/133.1; 425/191; 425/192 R; 425/462; 426/516; 426/517
[58] Field of Search .................. 425/133.1, 131.1, 186, 425/189, 191, 192 R, 240, 262, DIG. 228; 426/516, 517

[56] References Cited

U.S. PATENT DOCUMENTS

| 1,664,337 | 3/1928 | Vanderput | 425/133.1 |
| 3,241,503 | 3/1966 | Schafer | 425/462 |
| 3,806,290 | 4/1974 | Graff et al. | 425/133 |
| 3,856,448 | 12/1974 | Iijima et al. | 425/133.1 |
| 4,229,484 | 10/1980 | Steels et al. | 426/279 |
| 4,237,145 | 12/1980 | Risman et al. | 426/241 |
| 4,251,201 | 2/1981 | Krysiak | 425/132 |
| 4,309,450 | 1/1982 | Seibert | 426/92 |
| 4,469,475 | 9/1984 | Krysiak | 425/132 |
| 4,498,377 | 2/1985 | Smith | 425/133.1 |
| 4,698,000 | 10/1987 | Thulin et al. | 425/133.1 |
| 4,715,803 | 12/1987 | Koppa | 425/133.1 |
| 5,030,077 | 7/1991 | Orimoto et al. | 425/133.1 |

Primary Examiner—Jay H. Woo
Assistant Examiner—Khanh P. Nguyen
Attorney, Agent, or Firm—James E. Bradley

[57] ABSTRACT

An apparatus for co-extruding inner and outer bulk food products into a tubular product, such as a tamale. The device has an inner housing mounted concentrically in the outer housing. A piston locates in the inner housing. An annular piston locates in the outer housing in a clearance between the outer housing and the inner housing. An actuator will push the piston simultaneously forward. Outlet ports on the forward end of each housing cause the two food products to co-extrude as a composite product.

14 Claims, 2 Drawing Sheets

APPARATUS FOR CO-EXTRUDING TWO FOOD PRODUCTS

BACKGROUND OF THE INVENTION

1. Field of the invention

This invention relates in general to food processing machinery, and in particular to an apparatus which co-extrudes two bulk food product into a tubular composite product, with one of the food products being an outer liner, and the other food product being an inner core.

2. Description of the Prior Art

One type of food product that has an inner core and an outer layer of a different food product is a Mexican food product known as a tamale. The tamale has an inner core of meat and an outer layer of corn based material. The composite product is tubular and typically wrapped in a corn shuck Making tamales is time consuming. Particularly in the home and in small restaurants, the process is entirely by hand. The two bulk products, the meat and the corn outer layer will be prepared. Then the tamale is assembled by rolling and filling by hand.

Applicant is not aware of any currently commercially available machinery for forming the tamales in relatively small batches. Applicant is aware of a device utilized in the past which had two side-by-side cylinders, each having a piston. The cylinders connected to a chamber which extended perpendicular to the cylinders. The meat product would be placed in one, while the outer layer product would be placed in the other cylinder. A crank would push both pistons down at the same time. The product would co-extrude within the chamber. Applicant does not believe that these devices are marketed at this time, and is unaware of the quality of the final product produced by that device.

SUMMARY OF THE INVENTION

In this invention, an apparatus will co-extrude two bulk food products, such as the meat core and the corn based layer of a tamale. The device has a tubular outer housing and a tubular inner housing. The inner housing mounts concentrically in the outer housing and defines an annular clearance between the two housings. The inner housing has a piston, as well as the outer housing. The inner and outer housings each have outlet ports on a forward end.

The meat product is loaded in the inner housing, while the corn layer product is loaded in the outer housing. An actuator will push the pistons forward simultaneously. The corn based layer will co-extrude with the meat product, forming an outer jacket on the meat product.

In the preferred embodiment, the inner and outer cylinders each have conical forward ends. The outlet port of the inner housing is spaced rearward of the rearward end of the outlet port of the outer housing.

DETAILED DESCRIPTION OF THE INVENTION

Figure 2:
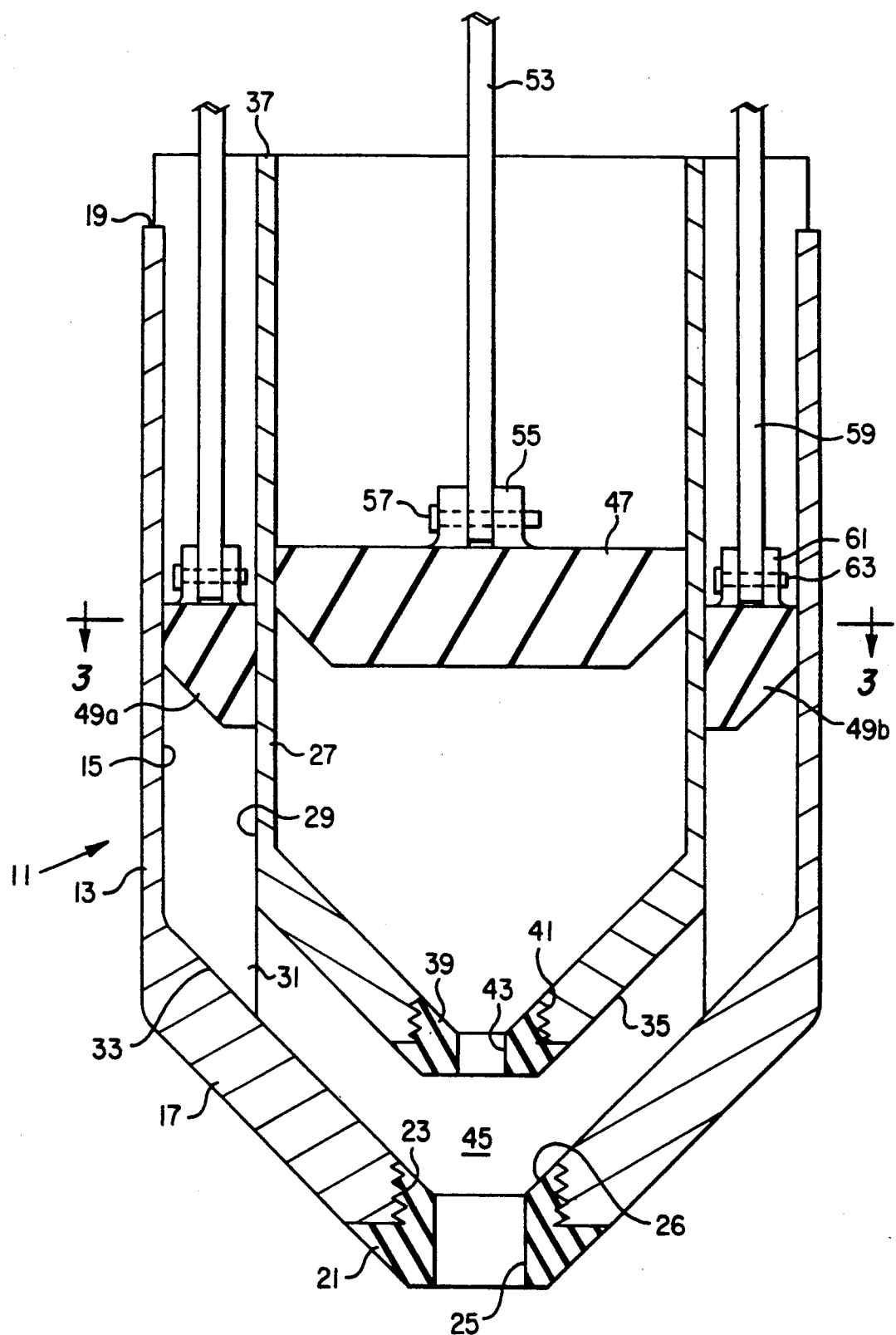
FIG. 2 is a longitudinal sectional view of a portion of the apparatus of FIG. 1.

Referring to FIG. 2, apparatus 11 has a cylindrical outer housing 13. Outer housing 13 has a cylindrical inner diameter 15 and a conical forward end 17 that protrudes outward. The rearward end 19 of outer housing 13 is open and cylindrical. The taper of the conical forward end 17 is about 45 degrees relative to the longitudinal axis of outer housing 13.

A nozzle 21 secures to a threaded hole 23 in the forward end 17 of outer housing 13. Nozzle 21 is preferably of a plastic material and has an axial outer housing port 25. Port 25 serves as an outlet port for outer housing 13 and is located on the longitudinal axis of outer housing 13. The rearward side 26 of nozzle 21 is conical and matches the taper of the conical inner wall of forward portion 17.

A cylindrical inner housing 27 mounts concentrically in the outer housing 13. Inner hosing 27 has the same shape as outer housing 13, but is smaller. The outer diameter of inner housing 27 is significantly less than the inner diameter 15 of outer housing 13. This results in an annular passage 29 located between the cylindrical wall of inner housing 27 and the cylindrical inner diameter 15 of outer housing 13.

A pair of centralizer plates 31 serves as mounting means for mounting the inner housing 27 in the outer housing 13. As shown also in FIGS. 1 and 3, each centralizer plate 31 is a flat metal strip that is secured to the exterior of the conical portion of inner housing 27. Each centralizer plate 31 extends radially outward. The centralizer plates 31 are spaced 180 degrees apart from each other and located in a common plane. The centralizer plates 31 have outer edges that engage grooves 32 formed in the inner diameter 15 of outer housing 13. Each centralizer plate 31 has an inclined forward edge 33 that matches the taper of the inner wall of the outer housing forward end 17. The centralizer plates 31 allow the inner housing 27 to slide into and out of the inner housing 13.

Inner housing 27 has a conical forward end 35 that is of the same taper as the forward end 17 of outer housing 13. Inner housing 27 has a rearward end 37 that is open and circular. A nozzle 39 secures in a threaded hole 41 in forward end 35. Nozzle 39 has a port 43 which serves as an outlet for the inner housing 27. Port 43 has a diameter that is smaller than the diameter of outer housing port 25.

The centralizer plates 31 extend past the cylindrical portion of the inner housing 27. This spaces the forward end 35 rearward of the inner wall of the outer housing forward end 17. This results in a conical clearance or passage 45 that leads forward from the annular passage 29 to the outer housing outlet port 25. The forward end of the inner housing nozzle 39 is spaced rearward of the rearward end 26 of outer housing nozzle 21. The rearward open end 37 of inner housing 27 will be spaced rearward of the rearward open end 19 of outer housing 19.

Figure 3:
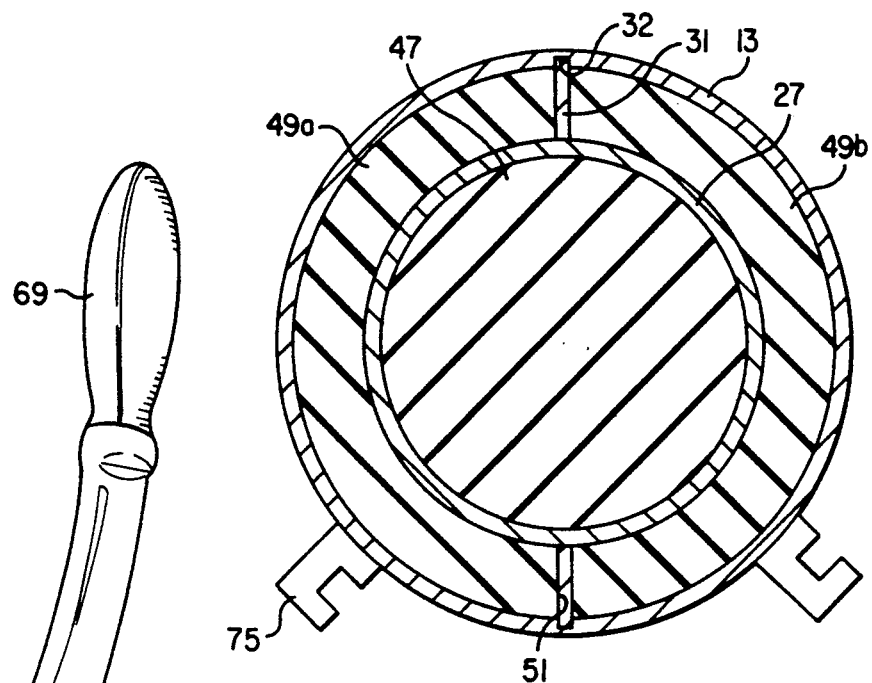
FIG. 3 is a vertical sectional view of the portion of the apparatus shown in FIG. 2, taken along the line FIG. 3—FIG. 3.

An inner piston 47 is reciprocally carried within the inner housing 27. An outer piston, comprising two semicircular halves 49a and 49b, is carried in the annular passage 29 between the inner housing 27 and outer housing 13. As shown in FIG. 3, the two halves of outer piston 49a,b, are separated by two slots 51. The slots 51 receive the two centralizer plates 31. The ends of the outer piston portions 49 a,b, will slide on the centralizer plates 31.

An actuator means serves to push the pistons 47 and 49a,b forward simultaneously. The actuator means includes an inner arm 53 that mounts pivotally to the piston 47. Inner arm 53 mounts pivotally to a bracket 55 by means of a pin 57. Inner arm 53 extends out the rearward end 37 of inner housing 27.

The actuator means includes a pair of outer arms 59, one pivotally mounted to the outer piston portion 49a, the other pivotally mounted to outer piston 21 portion 49b. The outer arms 59 extend out the rearward end 19 and are connected to bracket 61 by pins 63. The outer arms 59 are slightly longer than the inner arm slightly forward of the inner piston 47.

Figure 1:
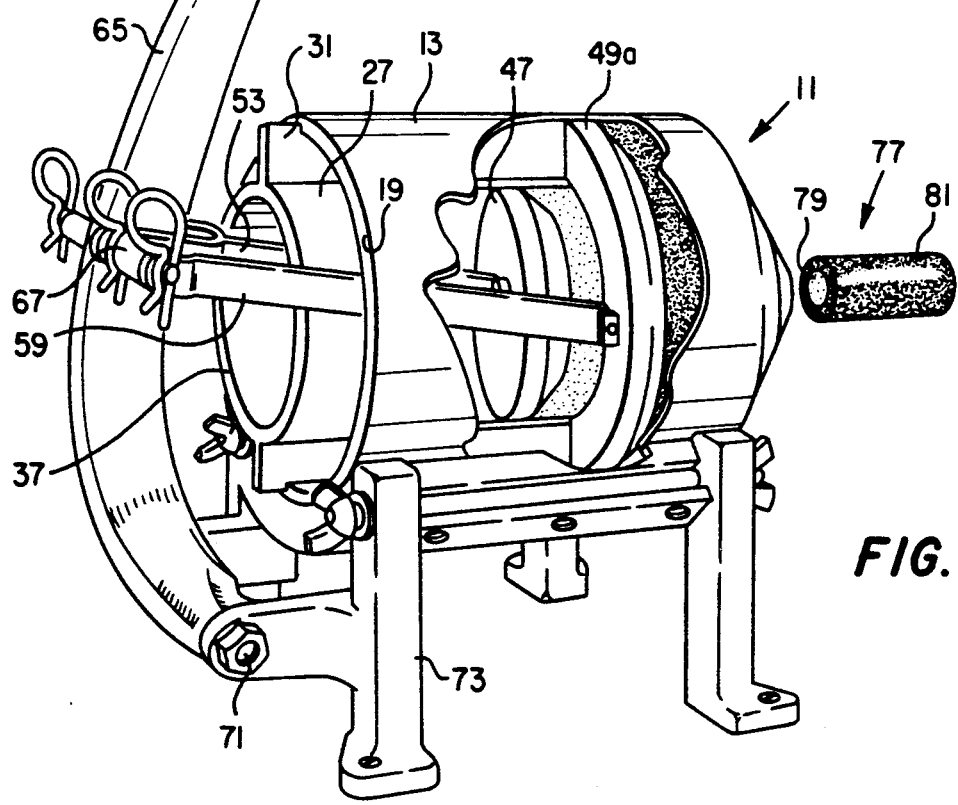
FIG. 1 is a perspective view, partially in section, illustrating an apparatus constructed in accordance with this invention.

Referring to FIG. 1, the actuator means includes a handle 65. Handle 65 connects to the rearward ends of the inner and outer arms 53, 59 by means of pins 67. Handle 65 has a gripping portion 69 on its free end. The other end connects pivotally by a bolt 71 to a base 73. Base 73 supports the outer housing 13 in a horizontal position. Lugs 75 (FIG. 3) engage rods (not shown) on the base 73 to facilitate removal of outer housing 13 for cleaning. The pistons 47 and 49a,b can be completely withdrawn from inner and outer housings 27,13 by rotating the handle 65 downward from the position shown in FIG. 1.

FIG. 1 also illustrates a typical extruded food product, which in this case represents a tamale 77. The inner core 79 is typically of meat. The outer layer 81 will be typically of corn based material. In operation, the user will prepare the two different food products 79, 81. The user will assemble the inner housing 27 within the outer housing 13 by sliding it in the rearward end 19. Prior to inserting the pistons 47, 49 a,b, the user will place the inner material 79 in the inner housing 27. The user will place the outer material 81 into the annular passage 29 and on the conical clearance 45. The user then positions the inner piston 47 at the rearward end 37 of inner housing 27. The user positions the piston portions 49a,b at the rearward end 19 of the outer housing 13. The user positions the pistons 47, 49 a,b by rotating the grip 69 upward until these members are located just in the rearward ends 37, 19.

The user then pushes the pistons 47, 49a,b forward simultaneously. He does this by rotating the grip 69 upward. The core material 79 will extrude through the inner housing port 43 and flow toward the outer housing port 25. The liner material 81 will flow through the annular passage 29, conical clearance 45 and out the outer passage 25. The materials 79, 81 co-extrude, forming the product 77.

After a selected length has been extruded, the user will cut the food product 77. He can then place it in a corn shuck (not shown) if cooking is expected to be performed immediately. Alternately, the user could freeze the food product 77 for later cooking.

The invention has significant advantages. The assembly is simple, but effective. It easily co-extrudes two food products into a combined food product. Nozzles with different dimensions and port shapes can be readily interchanged. The inner components can be easily removed for cleaning. The device speeds up considerably the time for processing food products such as tamales.

While the invention has been shown in only one of its forms, it should be apparent to those skilled in the art that it is not so limited, but is susceptible to various changes without departing from the scope of the invention.

I claim:

1. An apparatus for co-extruding inner and outer food products, comprising in combination:

a tubular outer housing having a longitudinal axis and an outer housing outlet port located on a forward end of the outer housing on the longitudinal axis, the outer housing having a cylindrical inner wall;

a tubular inner housing having an inner housing outlet port located on a forward end of the inner housing, the inner housing having a cylindrical inner wall and a cylindrical outer wall;

mounting means for mounting the inner hosing within the outer housing concentrically on the axis of the outer housing with the inner housing outlet port located on the longitudinal axis;

the inner housing having a lesser outer diameter than the inner diameter of the outer housing, defining an annular passage between the outer wall of the inner housing and the inner wall of the outer housing;

an inner portion reciprocally carried within the inner wall of the inner housing;

an outer piston reciprocally carried within the annular passage; and actuator means for pushing the pistons forward simultaneously to extrude the inner and outer food products through the inner and outer housing outlet ports, with the outer food product forming a layer around the inner food product wherein the mounting means comprises at least two centralizers located within the annular passage, each centralizer being a thin flat extending from the outer wall of the inner housing to the inner wall of the outer housing.

2. An apparatus for co-extruding inner and outer food products, comprising in combination:

a tubular outer housing having a longitudinal axis and an outer housing outlet port located on a forward end of the outer housing on the longitudinal axis;

a tubular inner housing having an inner housing outlet port located on a forward end of the inner housing;

mounting means for mounting the inner housing within the outer housing concentrically on the axis of the outer housing with the inner housing outlet port located on the longitudinal axis;

the inner housing having a lesser outer diameter than the inner diameter of the outer housing, defining an annular passage between the inner housing and the outer housing;

an inner piston reciprocally carried within the inner housing;

an outer piston reciprocally carried within the passage;

actuator means for pushing the pistons forward simultaneously to extrude the inner and outer food products through the inner and outer housing outlet ports, with the outer food product forming a layer around the inner food product; and wherein the mounting means comprises a pair of centralizers, each extending from the inner housing to the outer housing, defining two channel portions of the annular passage, and wherein the outer piston has two parts, each part extending around one of the channel portions of the annular passage from one of the centralizers to the other.

3. The apparatus according to claim 1 wherein the inner housing outlet port has a forward end that is rearward of the outer housing outlet port, and wherein each of the housings has a threaded hole on its forward end, and each of outlet ports is a threaded member for threaded reception within one of the threaded hole.

4. The apparatus according to claim 1 wherein the forward end of the inner housing and the forward end of the outer housing are conical, with the forward end of the outer housing located forward of the forward end of the inner housing, defining a conical clearance through which the outer food product is adapted to flow as it moves toward the outer housing outlet port; and wherein each of the housings has a threaded hole on its forward end, and each of outlet ports is a threaded member for threaded reception within one of the threaded holes.

5. The apparatus according to claim 1, further comprising a base which supports the outer housing; and wherein the actuator means comprises:
   a pair of outer arms pivotally mounted to the outer piston and extending rearward therefrom;
   an inner arm pivotally mounted to the inner piston and extending rearward therefrom; and
   a handle pivotally mounted to the base and to the arms, so that moving the handle forward pushes the arms and the pistons forward.

6. An apparatus for co-extruding inner and outer food products, comprising in combination:
   a cylindrical outer housing having a forward end, a longitudinal axis, and an outer housing outlet port located on the forward end of the outer housing on the longitudinal axis;
   a cylindrical inner housing located concentrically within the outer housing, defining an annular passage, the inner housing having an inner housing outlet port located on a forward end of the inner housing;
   a pair of centralizer plates, circumferentially spaced from each other and extending between the inner housing and the outer housing in the annular passage to support the inner housing within the outer housing;
   an inner piston reciprocally carried within the inner housing;
   an outer piston reciprocally carried within the annular passage, the outer piston having two parts separated by and in sliding engagement with the centralizer plates; and
   actuator means for pushing the pistons forward simultaneously to extrude the inner and outer food products through the inner and outer housing outlet ports, with the outer food product forming a layer around the inner food product.

7. The apparatus according to claim 6 wherein the inner housing outlet port has a forward end that is rearward of the outer housing outlet port.

8. The apparatus according to claim 6, wherein the forward end of the inner housing and the forward end of the outer housing are conical, with the forward end of the outer housing located forward of the forward end of the inner housing, defining a conical clearance through which the outer food product is adapted to flow as it moves toward the outer housing outlet port.

9. The apparatus according to claim 6 wherein the forward end of the inner housing and the forward end of the outer housing are conical, with the forward end of the outer housing located forward of the forward end of the inner housing, defining a conical clearance through which the outer food product is adapted to flow as it moves toward the outer housing outlet port, and wherein the forward end of the inner housing outlet port is located rearward of the rearward end of the outer housing outlet port.

10. The apparatus according to claim 6 further comprising a base which supports the outer housing; and wherein the actuator means comprises:
    a pair of outer arms pivotally mounted to the outer piston and extending rearward therefrom;
    an inner arm pivotally mounted to the inner piston and extending rearward therefrom; and
    a handle pivotally mounted to the base and to the arms, so that moving the handle forward pushes the arms and the pistons forward simultaneously.

11. The apparatus according to claim 6 further comprising:
    an opening at a rearward end of the inner housing which allows the inner piston to be withdrawn and the inner food product to be placed within the inner cylinder; and
    an opening at a rearward end of the outer housing which allows the outer piston to be withdrawn and the outer food product placed within the outer cylinder.

12. An apparatus for co-extruding inner and outer food products, comprising in combination:
    a base;
    a cylindrical outer housing mounted to the base and having a protruding conical forward end, a longitudinal axis, and an outer housing outlet port located on the forward end of the outer housing on the longitudinal axis;
    a cylindrical inner housing located concentrically within the outer housing, defining an annular passage, the inner housing having a protruding conical forward end and an inner housing outlet port located on the forward end of the inner housing;
    the forward end of the inner housing being located rearward of the forward end of the outer housing, defining a conical clearance, the inner housing outlet port terminating rearward of the outer housing outlet port;
    the inner and outer housings having open rearward ends;
    a pair of centralizer plates, spaced on opposite sides from each other and extending between the inner housing and the outer housing in the annular passage to support the inner housing within the outer housing;
    an inner piston reciprocally carried within the inner housing;
    an outer piston reciprocally carried within the annular passage, the outer piston having two parts separated by and in sliding engagement with the centralizer plates;
    the open rearward ends of the inner and outer housings allowing the inner and outer pistons to be withdrawn and the inner food product to be placed in the inner housing and the outer food product in the annular passage;
    a pair of outer arms pivotally mounted to the outer piston and extending rearward therefrom;
    an inner arm pivotally mounted to the inner piston and extending rearward therefrom; and
    a handle pivotally mounted to the base and to the arms, so that rotating the handle upward pushes the arms and the pistons forward for pushing the pistons simultaneously to extrude the inner and outer food products through the inner and outer housing outlet ports, with the outer food product forming a layer around the inner food product.

13. The apparatus according to claim 12 wherein the inner arm has a different length than the outer arms to facilitate insertion of the inner and outer pistons into the inner and outer housings.

14. The apparatus according to claim 12 wherein the open rearward end of one of the housings is located rearward of the open rearward end of the other of the housings to facilitate insertion of the inner and outer pistons into the inner and outer housings.

* * * * *